(12) United States Patent
Tussing et al.

(10) Patent No.: US 11,228,219 B2
(45) Date of Patent: Jan. 18, 2022

(54) WINDING SUPPORT AND STATOR

(71) Applicant: Hilti Aktiengesellschaft, Schaan (LI)

(72) Inventors: Torsten Tussing, Landsberg am Lech (DE); Helmut Burger, Unterdiessen (DE); Wolfgang Ludwig, Zaisertshofen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/344,533

(22) PCT Filed: Oct. 12, 2017

(86) PCT No.: PCT/EP2017/076007
§ 371 (c)(1),
(2) Date: Apr. 24, 2019

(87) PCT Pub. No.: WO2018/077625
PCT Pub. Date: May 3, 2018

(65) Prior Publication Data
US 2019/0288575 A1 Sep. 19, 2019

(30) Foreign Application Priority Data

Oct. 25, 2016 (EP) .................................. 16195417

(51) Int. Cl.
| H02K 3/32 | (2006.01) |
| H02K 1/14 | (2006.01) |
| H02K 7/14 | (2006.01) |
| H02K 3/52 | (2006.01) |
| B25F 5/02 | (2006.01) |

(52) U.S. Cl.
CPC ............. *H02K 3/325* (2013.01); *H02K 1/146* (2013.01); *H02K 3/522* (2013.01); *H02K 7/145* (2013.01); *B25F 5/02* (2013.01)

(58) Field of Classification Search
CPC ........ H02K 3/325; H02K 1/146; H02K 3/522; H02K 7/145; B25F 5/02
USPC .......................................................... 310/50
See application file for complete search history.

(56) References Cited

U.S. PATENT DOCUMENTS

| 4,028,573 A * | 6/1977 | Terrone .................... H02K 1/26 310/216.115 |
| 7,242,125 B2 * | 7/2007 | Schneider .............. H02K 3/345 310/194 |
| 8,853,910 B2 * | 10/2014 | Sato ..................... H02K 15/095 310/194 |
| 9,461,515 B2 * | 10/2016 | Furukawa .............. H02K 3/345 |

(Continued)

FOREIGN PATENT DOCUMENTS

| CN | 201307796 Y | 9/2009 |
| JP | 2012095488 A * | 5/2012 |

(Continued)

*Primary Examiner* — Alex W Mok
(74) *Attorney, Agent, or Firm* — Davidson, Davidson & Kappel, LLC

(57) ABSTRACT

A winding support (100) that serves to at least partially accommodate a stator coil of a stator, whereby the winding support (100) has a plurality of protrusions (1, 2, 3, 4, 5, 6) that can each be inserted in an insertion direction (E) into a cavity that is formed by two adjacent stator pole teeth of a laminated core of the stator, whereby at least one of the protrusions (1, 3, 5) has a different length in the insertion direction (E) than at least one of the other protrusions (2, 4, 6).

19 Claims, 8 Drawing Sheets

(56) References Cited

U.S. PATENT DOCUMENTS

| | | | | |
|---|---|---|---|---|
| 2002/0047457 A1* | 4/2002 | Yoshikawa | ............... | H02K 3/38 |
| | | | | 310/215 |
| 2004/0245882 A1* | 12/2004 | Horie | ..................... | H02K 3/522 |
| | | | | 310/194 |
| 2006/0091757 A1 | 5/2006 | Aoki et al. | | |
| 2010/0171380 A1* | 7/2010 | De Filippis | ............ | H02K 1/185 |
| | | | | 310/64 |
| 2013/0043743 A1* | 2/2013 | Kim | ......................... | H02K 3/32 |
| | | | | 310/43 |
| 2013/0062972 A1* | 3/2013 | Sato | ......................... | H02K 3/24 |
| | | | | 310/43 |
| 2013/0193800 A1* | 8/2013 | Yokogawa | ............. | H02K 3/522 |
| | | | | 310/215 |
| 2013/0221770 A1* | 8/2013 | Yokogawa | ............. | H02K 1/148 |
| | | | | 310/43 |
| 2014/0203671 A1* | 7/2014 | Ha | ........................ | H02K 1/04 |
| | | | | 310/43 |
| 2015/0338243 A1* | 11/2015 | Miyao | .................... | H01F 41/10 |
| | | | | 324/207.16 |
| 2016/0028285 A1* | 1/2016 | Ogawa | ..................... | H02K 3/34 |
| | | | | 310/216.001 |

FOREIGN PATENT DOCUMENTS

| | | | | | |
|---|---|---|---|---|---|
| JP | | 2013247763 A | | 12/2013 | |
| JP | | 2017192238 A | * | 10/2017 | ......... H02K 11/0094 |
| WO | WO-2009019562 A2 | * | 2/2009 | ............... H02K 9/22 |
| WO | WO-2012090424 A1 | * | 7/2012 | ............. H02K 3/522 |

* cited by examiner

Prior Art

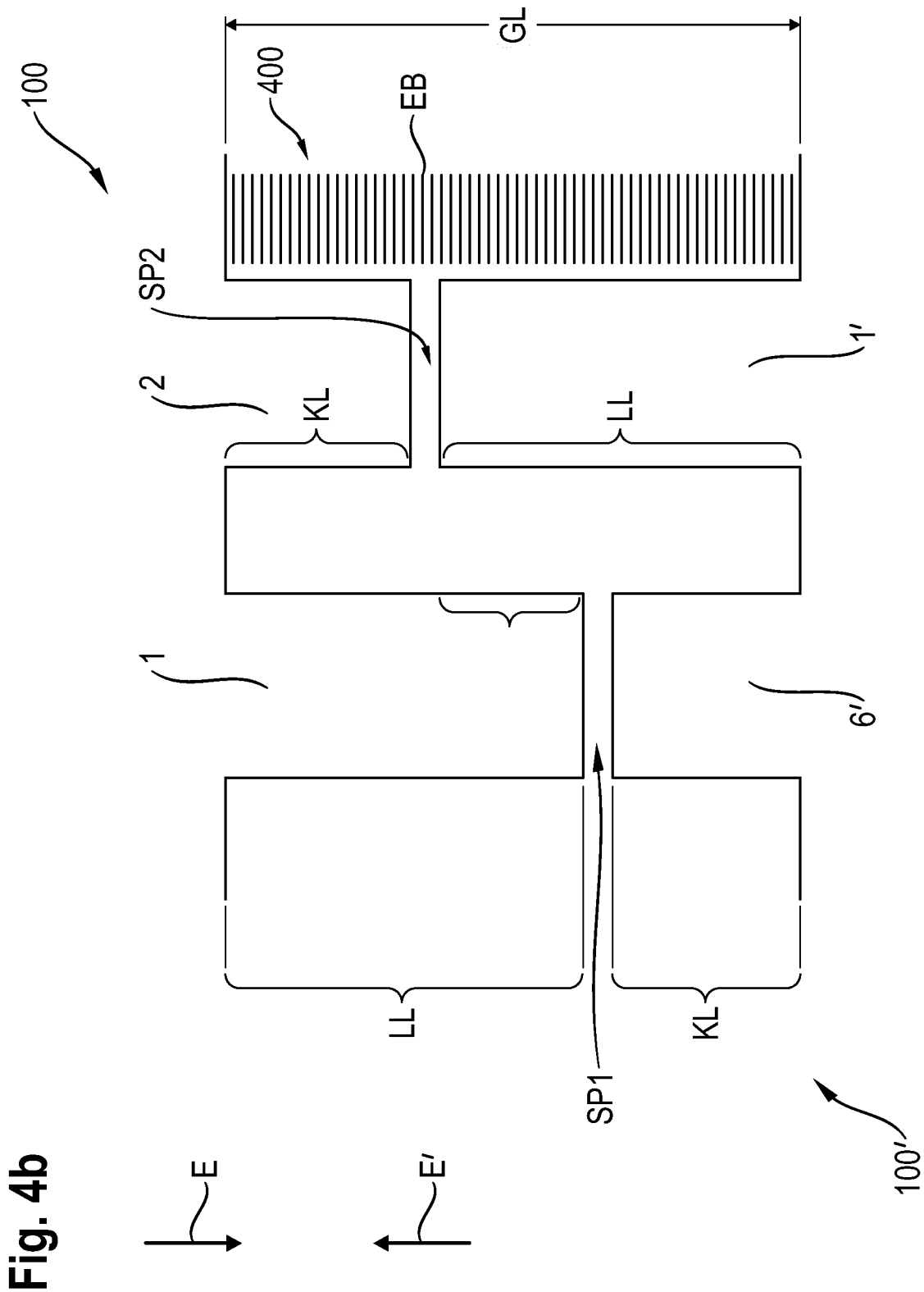

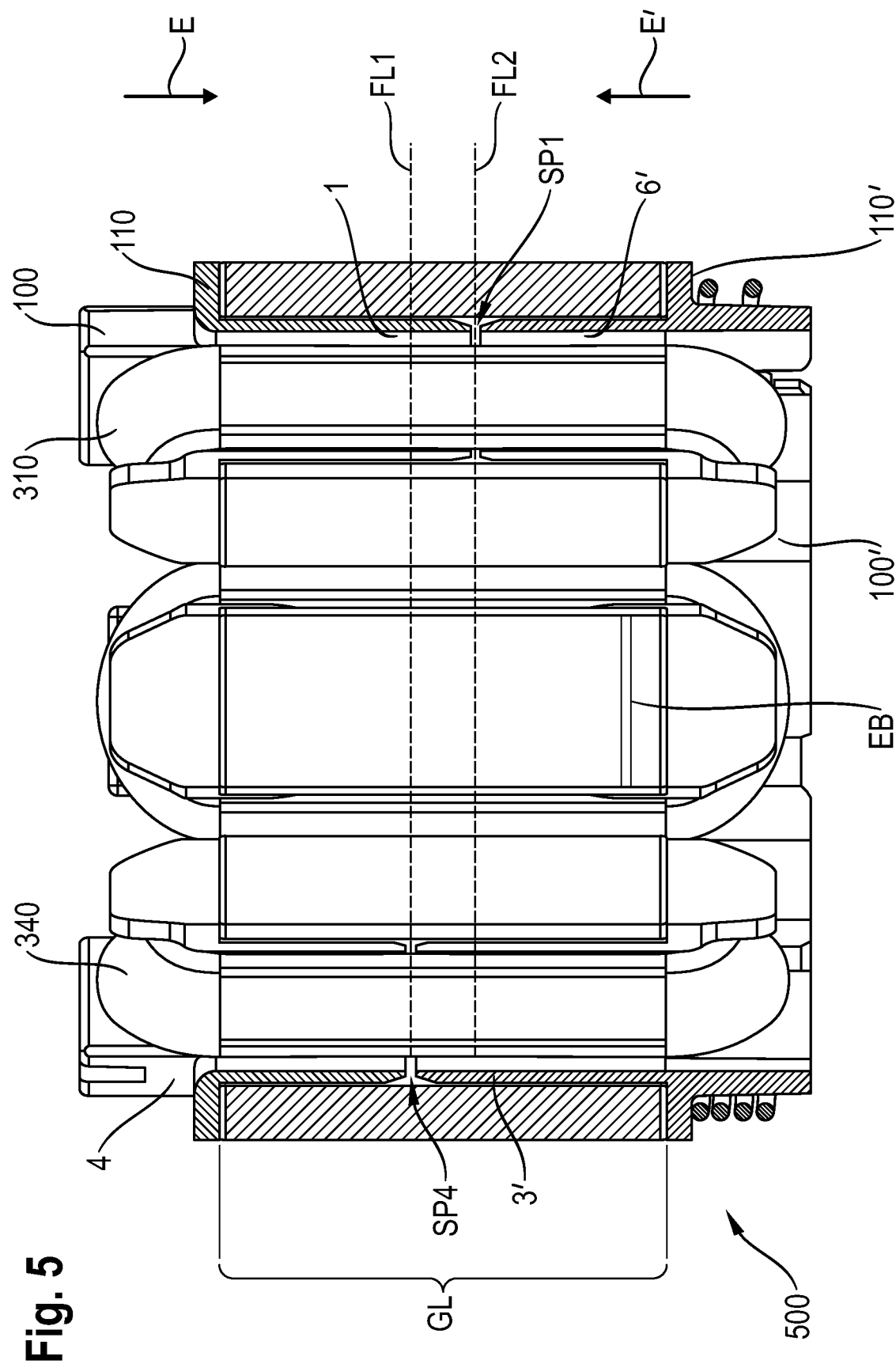

WINDING SUPPORT AND STATOR

The present invention relates to a winding support that serves to at least partially accommodate a stator coil of a stator. The winding support has a plurality of protrusions that can each be inserted in an insertion direction into a cavity that is formed by two adjacent stator pole teeth of a laminated core of the stator. The present invention likewise relates to a stator for an electric motor, whereby the stator has a laminated core with a plurality of stator pole teeth and two winding supports, whereby each of the winding supports has a plurality of protrusions that are inserted into the laminated core.

BACKGROUND

The state of the art discloses, for example, winding supports whose protrusions are connected to each other in the form of a ring and that are made of an electrically insulating plastic in order to electrically insulate the laminated core and the stator coils from each other. A stator known from the state of the art typically has two winding supports that are inserted into the laminated core on opposite sides of the laminated core and that together, accommodate a stator coil.

In a structurally minimal solution, the winding supports extend into the laminated core only by a relatively short distance, whereby electric insulation is ensured in that an air gap remains between the stator coil and the stator pole tooth. In many cases, however, the inserted winding supports insulate the laminated core over its entire length, whereby each of the winding supports covers about half the length of the laminated core. In the middle of the laminated core, a gap typically remains in order to compensate for the length tolerance of the laminated core.

SUMMARY OF THE INVENTION

It is an object of the present invention to create a winding support that forms the basis for a stator that is very easy to handle. It is likewise an object of the present invention to put forward a stator that is very easy to handle.

When it comes to the winding support, the present invention provides that at least one of the protrusions has a different length in the insertion direction than at least one of the other protrusions.

When it comes to the stator, the present invention provides that the stator has two winding supports, whereby each of the two winding supports has at least one protrusion that has a different length in the insertion direction than at least one of the other protrusions, whereby the protrusions have to be or are inserted into the cavities in such a way that a longer protrusion of the first winding support and a shorter protrusion of the second winding support are located in the same cavity of the laminated core.

The invention encompasses the realization that the laminated core of a stator is made up of a plurality of individual laminations (individual lamination thickness typically between 0.35 mm and 0.5 mm) that are held together by stacking points. They have to hold the laminated core together, mainly during the assembly procedure, from the stacking of the stamped cores all the way to the winding procedure. After that, the laminated core is stabilized by the stator winding. If the stacking points are too weak, the laminated core can break apart while it is being transported or being inserted into the winding device. In actual practice, this happens frequently since laminated cores are usually not manufactured at the site of the stator installation, and consequently they sometimes have to be transported over long distances.

In this context, it has been recognized that, in the stators according to the state of the art, the continuously circumferential compensation gap that remains between the winding supports forms an undesired rupture point. Consequently, the layered structure of the laminated core can cause a break to occur in the area of the gap.

In contrast to this, in the stator according to the invention, a longer protrusion of the first winding support and a shorter protrusion of the second winding support can be located in the same cavity of the laminated core, as a result of which a continuously circumferential compensation gap can be avoided. This reduces or eliminates the risk of breaks, so that the stator according to the invention is very easy to handle. This not only retains the advantage of the electric insulation between the laminated core and the stator coil, but also the advantage of a gap to compensate for a length tolerance of the laminated core.

In an especially preferred embodiment of the winding support, an even number of protrusions is provided. Preferably, the winding support has precisely six protrusions. It has proven to be advantageous for the winding support to be made of an electrically insulating plastic. Preferably, the protrusions are connected to each other in the form of a ring.

In another especially preferred embodiment, two adjacent protrusions each have different lengths. If there is an even number of protrusions, then a short protrusion and a long protrusion can be arranged alternately along the circumference of the winding support. Non-adjacent protrusions are preferably each of the same length.

As an alternative, at least two, preferably three, adjacent protrusions can have the same length. For example, if precisely six protrusions are provided, whereby three adjacent protrusions have the same length, then these three adjacent protrusions can form a semi-circle with long protrusions. Correspondingly, three adjacent protrusions with the same, shorter length can form a semi-circle with short protrusions. It has proven to be advantageous for a longer protrusion to be at least 20% longer than a shorter protrusion.

Especially preferred embodiments of the stator are presented below. The stator has a laminated core and two winding supports as described above. Preferably, the two winding supports are configured to be complementary to each other. This does not necessarily mean that the first and the second winding supports have to have an identical configuration. Thus, the first and the second winding supports can exhibit, for example, structural differences in the area of the winding heads and/or structural differences on each of their sides facing away from the laminated core.

Within the scope of the present invention, the term "complementary" means that a longer protrusion of the first winding support and a shorter protrusion of the second winding support—when the winding supports have been inserted all the way into the laminated core—complement each other in terms of their length relative to the total length of the laminated core, minus an air gap, which is preferably less than 2 mm.

It has proven to be advantageous for the winding supports to be rotated by a given angle relative to each other, whereby this angle is 360 degrees/number of stator pole teeth.

Especially preferably, each surface, which is oriented normal to the insertion direction and which is situated within the total length of the laminated core, intersects at least one of the protrusions.

In an especially preferred embodiment, air gaps that are each equal in size are provided between the protrusions of the first winding support and the corresponding protrusions of the second winding support, relative to the insertion direction.

It has proven to be advantageous for the protrusions of the first winding support and the corresponding protrusions of the second winding support to overlap, relative to the insertion direction. Preferably, the thus-defined overlapping area is larger, preferably at least 5 times larger, than the thickness of the individual laminations of the laminated core. A preferred thickness of an individual lamination is between 0.35 mm and 0.5 mm.

The invention likewise encompasses an electric motor that has a stator as described above. The invention likewise encompasses a hand-held power tool with such an electric motor.

Additional advantages ensue from the description of the figures given below. The figures show various embodiments of the present invention. The figures, the description and the claims contain numerous combinations of features. The person skilled in the art will advantageously also consider the features individually and merge them to create meaningful combinations.

BRIEF DESCRIPTION OF THE DRAWINGS

Identical and similar components are designated in the figures with the same reference numerals. The following is shown:

FIG. 4B a partial view of two complementary winding supports;

FIG. 5 a stator with the winding supports shown in FIG. 4A, fitted with stator coils.

DETAILED DESCRIPTION

State of the Art

Figure 1:
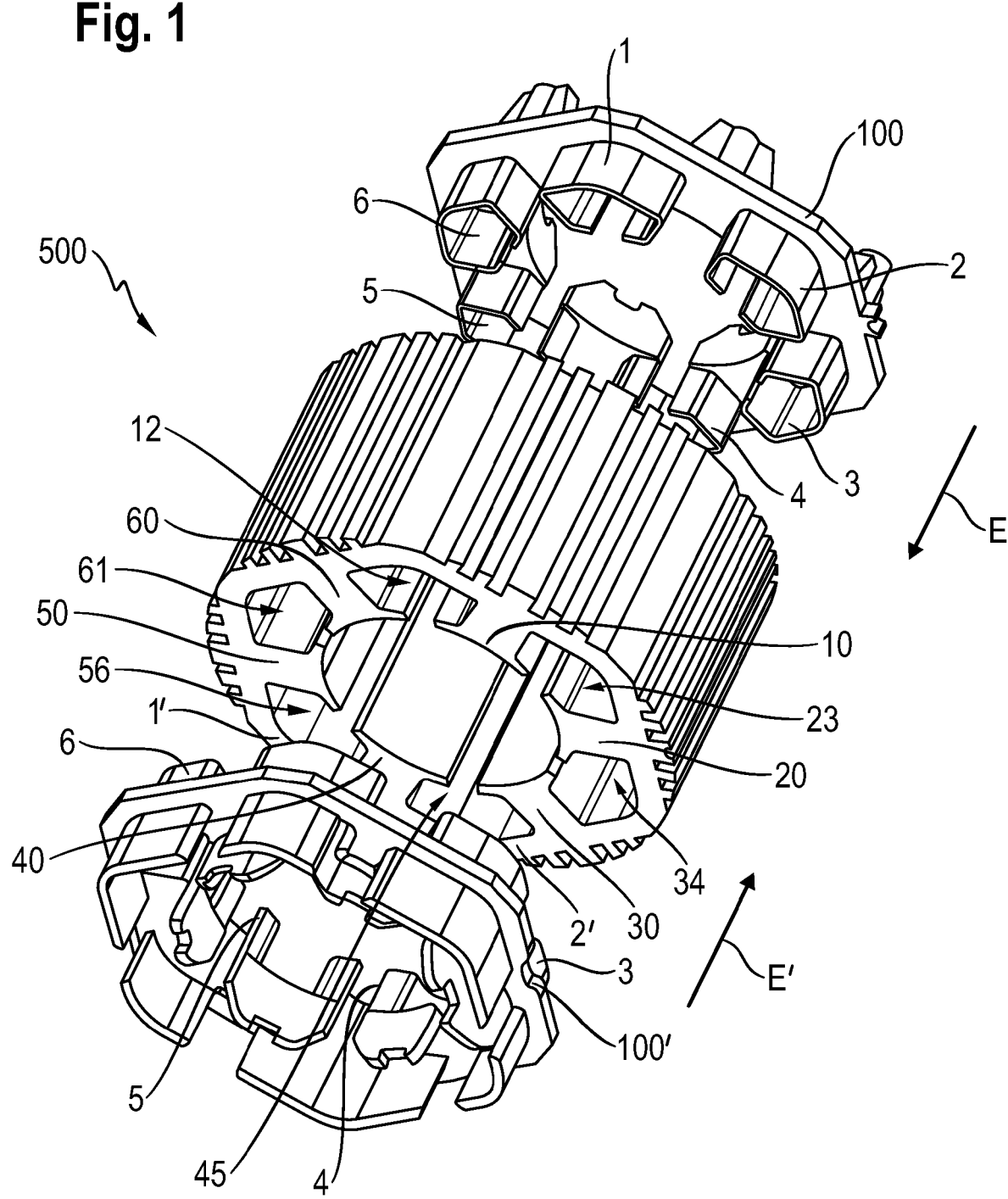
FIG. 1 a stator known from the state of the art.

FIG. 1 shows a stator 500 known from the state of the art. The stator 500 has a laminated core 400 with six stator pole teeth 10, 20, 30, 40, 50, 60, whereby each of two adjacent teeth form a cavity 12, 23, 34, 45, 56, 61.

The stator 500 likewise has a first winding support 100 and a second winding support 100'. The winding supports 100, 100' have not been inserted into the laminated core 400.

The first winding support 100 has six protrusions 1, 2, 3, 4, 5, 6 that are each to be inserted in an insertion direction E into the appropriate cavity 12, 23, 34, 45, 56, 61 of the laminated core 400 of the stator 500. The second winding support 100 likewise has six protrusions 1', 2', 3', 4', 5', 6' that are each to be inserted in an insertion direction E' into the appropriate cavity 12, 23, 34, 45, 56, 61 of the laminated core 400 of the stator 500.

The six protrusions 1, 2, 3, 4, 5, 6 of the first winding support 100 and the six protrusions 1', 2', 3', 4', 5', 6' of the second winding support 100' each have identical lengths, relative to their appertaining insertion direction E, E'.

FIG. 1 shows a structurally minimal solution of the winding supports 100, 100' in which the protrusions 1, 2, 3, 4, 5, 6; 1', 2', 3', 4', 5', 6' extend into the laminated core 400 only by a relatively short distance, that is to say, essentially in the area of a winding head K, K' at the beginning and at the end of the laminated core 400.

Figure 2:
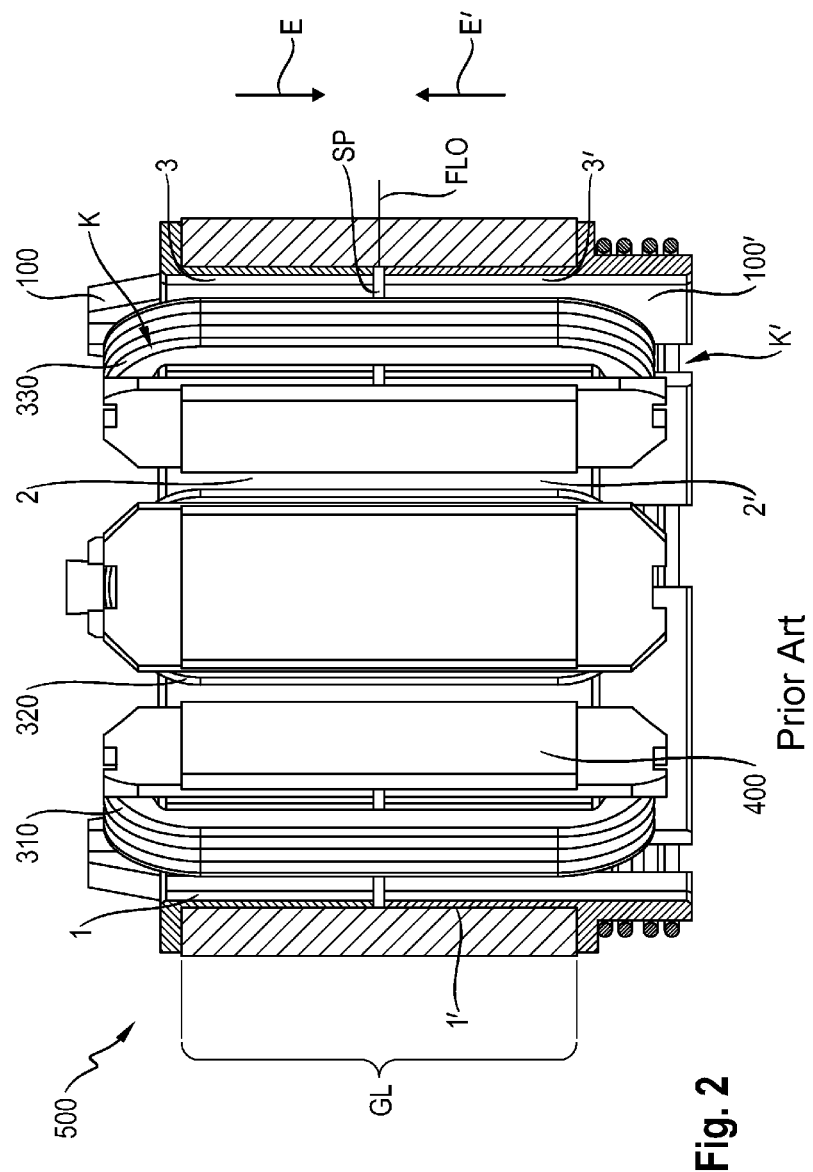
FIG. 2 a second stator known from the state of the art, with stator coils.

FIG. 2 shows another stator 500 known from the state of the art. For the sake of clarity, a sectional view was selected in which three (of six) stator coils 310, 320, 330 can be seen. The laminated core 400 is identical to the laminated core 400 shown in FIG. 1.

The winding supports 100, 100' inserted into the laminated core 400 insulate the laminated core 400 over the entire length of the laminated core GL, whereby each of the winding supports 100, 100' covers about half the length of the laminated core GL. A gap SP remains in the middle of the laminated core 400 in order to compensate for the length tolerance of the laminated core 400.

In FIG. 2, in the stator 400 according to the state of the art, the continuously circumferential compensation gap SP that remains between the winding supports 100, 100' forms an undesired rupture point. In other words, there is at least one surface FL0 that is oriented normal to the insertion direction E, E' and that is situated within the total length GL of the laminated core 400 and that does not intersect any of the protrusions 1, 2, 3, 4, 5, 6; 1', 2', 3', 4', 5', 6'.

Embodiments

Figure 3:
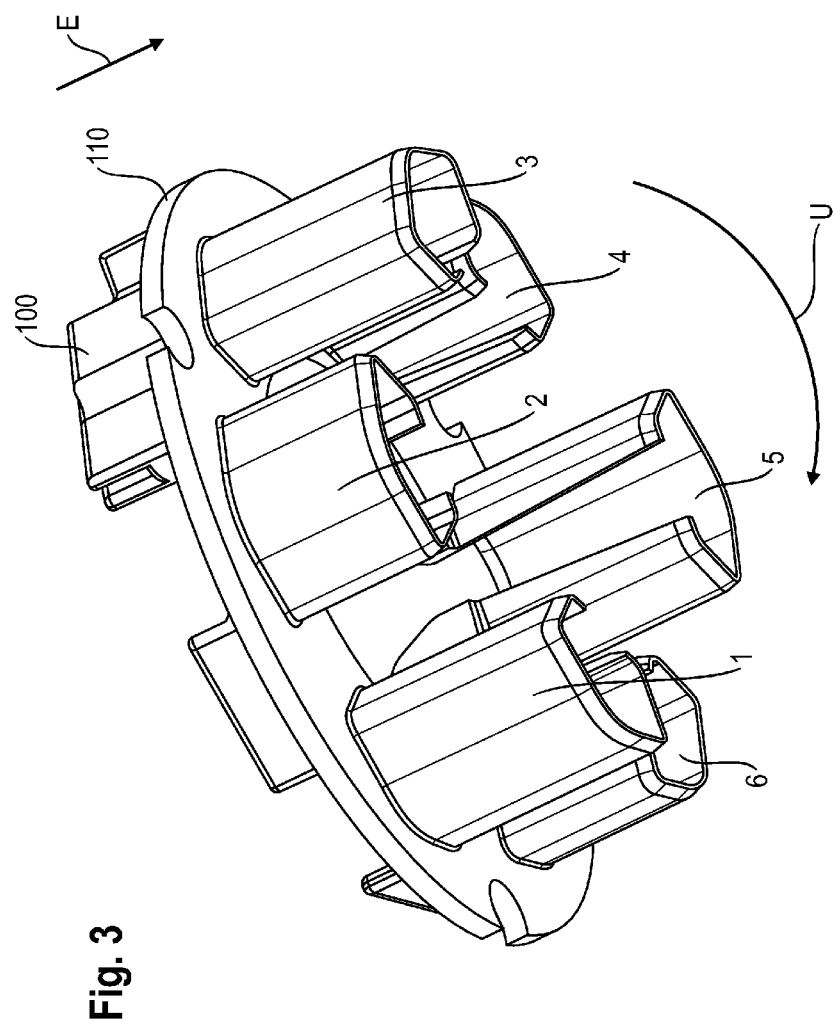
FIG. 3 a preferred embodiment of a winding support according to the invention.

FIG. 3 shows a preferred embodiment of a winding support 100 according to the invention. The winding support 100 is configured to at least partially accommodate a stator coil 300, 320, 330 (see FIG. 5) of a stator 500.

The winding support 100 has precisely six protrusions 1, 2, 3, 4, 5, 6. The protrusions 1, 2, 3, 4, 5, 6 are each to be inserted in an insertion direction E into a cavity 12, 23, 34, 45, 56, 61 (see FIG. 1) that is formed by two adjacent stator pole teeth 60, 10; 10, 20; 20, 30; 30, 40; 40, 50; 50, 60 of a laminated core 400 of a stator 500 (see FIG. 1).

In the embodiment shown in FIG. 3, precisely three of the protrusions 1, 3, 5 in the insertion direction E have different, namely, greater lengths than the remaining other protrusions 2, 4, 6. Here, two immediately adjacent protrusions 1, 2; 2, 3; 3, 4; 4, 5; 5, 6; 6, 1 each have different lengths. In other words, a short protrusion 2, 4, 6 and a long protrusion 1, 3, 5 are distributed alternately along the circumference U of the winding support 100.

The winding support 100 is made of an electrically insulating plastic and the protrusions 1, 2, 3, 4, 5, 6 are connected to each other in the form of a ring, in the present embodiment, by means of an appertaining connecting ring 110.

Figure 4A:
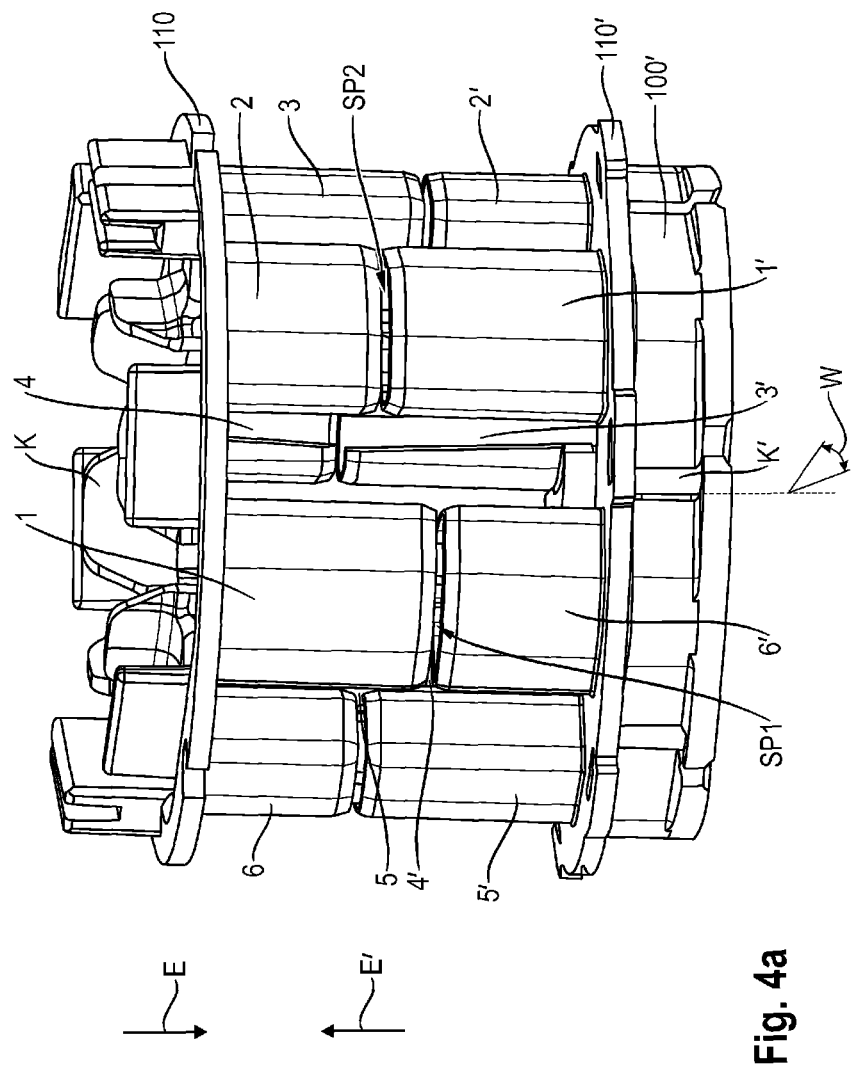
FIG. 4A the winding support shown in FIG. 3, with a complementary (second) winding support.

FIG. 4A shows the winding support 100 of FIG. 3, with a complementary second winding support 100' (at the bottom in FIG. 4A).

The first winding support 100 and the second winding support 100' have an identical configuration as far as the protrusions 1, 2, 3, 4, 5, 6; 1', 2', 3', 4', 5', 6' are concerned. Here, the winding supports 100, 100' are rotated by a given angle W relative to each other, whereby the angle is 60 degrees, since the winding supports 100, 100' are configured for a laminated core with precisely six stator pole teeth 10, 20, 30, 40, 50, 60 (see FIG. 1).

The protrusions 1, 2, 3, 4, 5, 6; 1', 2', 3', 4', 5', 6'-based on the depiction in FIG. 4A—would be inserted into the cavities in such a way that a longer protrusion 1 of the first winding support 10 and a shorter protrusion 6' of the second winding support 100' are located in the same cavity 12.

It should be pointed out that here, the first and second winding supports 100, 100' have structural differences in the area of the winding heads K, K' and structural differences on each of their sides of the connecting rings 110, 110' facing away from the laminated core (not shown here).

Making reference to FIG. 4B, an overlapping of protrusions will be explained below by way of an example. For this purpose, FIG. 4B shows a partial view of two complementary winding supports 100, 100'.

The longer protrusion 1 of the first winding support 100 and the shorter protrusion 6' of the second winding support 100' complement each other in terms of their length relative to the total length GL of the laminated core 400, minus an air gap SP1 (LL+KL=GL−SP1) when the winding supports 100, 100' are inserted all the way into the laminated core 400 (this is shown in FIG. 4B).

By the same token, the shorter protrusion 2 of the first winding support 100 and the longer protrusion V of the second winding support 100' complement each other in terms of their length relative to the total length GL of the laminated core 400, minus an air gap SP2 (LL+KL=GL−SP2). Relative to the insertion direction E, E', the air gaps SP1, SP2 have the same length.

By way of example, at a total length GL of the laminated core 400 amounting to 27 mm, the long protrusions 1, 1' have a length LL of 15 mm while the short protrusions 2, 6' have a length KL of 11 mm. The air gaps SP1, SP2 are each 1 mm long. The protrusions 1, 2 of the first winding support 100 and the corresponding protrusions 6', 1' of the second winding support 100' overlap, relative to the insertion direction E, E', in an overlapping area UB, that is thus, for instance, 3 mm wide by way of example. The overlapping area UB is also at least 5 times greater than the thickness of the individual laminations EB of the laminated core 400, which is, for instance, 0.35 mm.

FIG. 5 shows a stator 500 with a laminated core 400 into which the winding supports 100, 100' of FIG. 4A have been properly inserted. For the sake of clarity, a sectional view was selected in which two (of six) stator coils 310, 340 can be seen. The laminated core 400 is identical to the laminated core 400 shown in FIG. 1.

As can be seen in FIG. 5, there is no surface that is oriented normal to the insertion direction E, E' and that is situated within the total length GL of the laminated core and that does not intersect at least one of the protrusions 1, 3'. Thus, for example, a first surface FL1 runs without intersections through a first air gap SP1 that is situated between two corresponding protrusions 1, 6'. However, it is precisely this first surface that intersects another protrusion 4 of the first winding support 100.

Consequently, each surface—here, for instance, the surfaces FL1, FL2—that is oriented normal to the insertion direction E and that is situated within the total length GL of the laminated core, intersects at least one of the protrusions 1, 3'.

Figure 6:
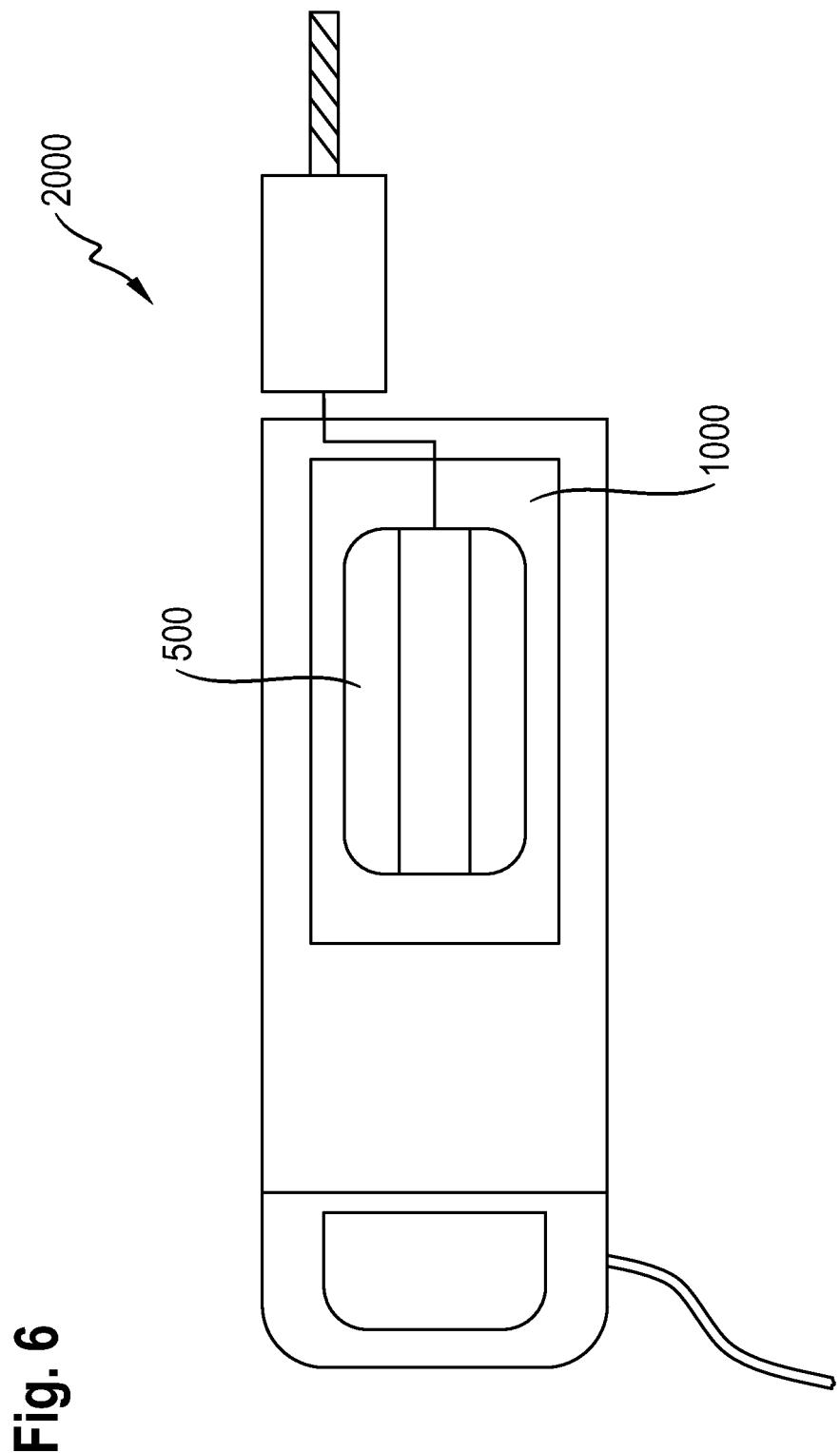
FIG. 6 a hand-held power tool with a electric motor and a stator.

Finally, FIG. 6 shows a hand-held power tool 2000 with an electric motor 1000 into which—schematically depicted—a stator 500 according to the invention has been installed.

Figure 7:
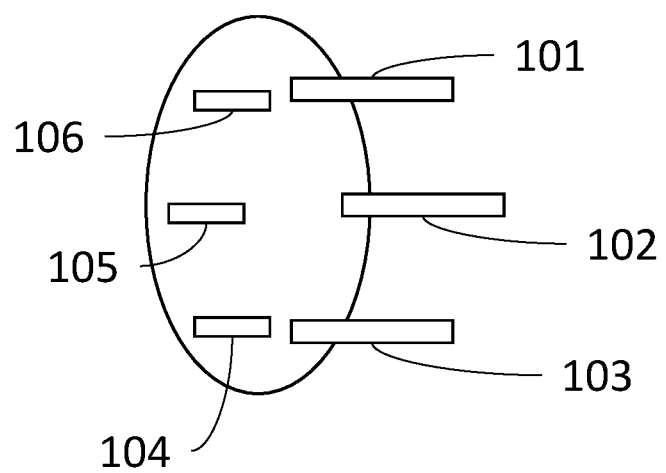
FIG. 7 an alternate embodiment of a winding support according to the invention.

An alternative embodiment is shown solely schematically in FIG. 7 in which three adjacent protrusions can have the same length. Precisely six protrusions 101, 102, 103, 104, 105, 106 are provided, whereby three adjacent protrusions 101, 102, 103 have the same length, then these three adjacent protrusions can form a semi-circle with long protrusions. Correspondingly, three adjacent protrusions 104, 105, 106 with the same, shorter length can form a semi-circle with short protrusions.

LIST OF REFERENCE NUMERALS

100, 100' first, second winding support
110, 110' connecting ring
1, 2, 3, 4, 5, 6 protrusions of the first winding support
1', 2', 3', 4', 5' 6' protrusions of the second winding support
10, 20, 30, 40, 50, 60 stator pole teeth
12, 23, 34, 45, 56, 61 cavity
101, 102, 103, 104, 105, 106 protrusions of an alternate embodiment
300, 310, 320, 330, 340 stator coil
400 laminated core
500 stator
1000 electric motor
2000 hand-held power tool
E, E' insertion direction
EB thickness of the individual laminations
FL0, FL1, FL2 surfaces
GL total length of the laminated core
K, K' winding head
SP, SP1, SP2, SP4 air gap
U circumference
UB overlapping area
W angle

What is claimed is:

1. A winding support serves to at least partially accommodate a stator coil of a stator, the winding support comprising:
    a plurality of protrusions insertable in an insertion direction into a cavity formed by two adjacent stator pole teeth of a laminated core of the stator, at least one of the protrusions having a different length in the insertion direction than at least one of the other protrusions and wherein at least two adjacent protrusions have a same length; wherein at least two other adjacent protrusions each have a different length from the same length.

2. The winding support as recited in claim 1 wherein the at least two other protrusions are each of a further same length.

3. The winding support as recited in claim 1 wherein the at least two adjacent protrusions having the same length include three adjacent protrusions have the same length.

4. The winding support as recited in claim 1 wherein the winding support is made of an electrically insulating plastic and the protrusions are connected to each other in the form of a ring.

5. A stator for an electric motor, the stator comprising:
    a laminated core with a plurality of stator pole teeth, each pair of adjacent teeth forming a cavity; and
    a first and second winding supports, each as recited in claim 1, whose protrusions are inserted into the cavities in such a way that a longer protrusion of the first winding support and a shorter protrusion of the second winding support are located in the same cavity.

6. The stator as recited in claim 5 wherein the first and second winding supports are configured to be complementary to each other.

7. The stator as recited in claim 5 wherein the winding supports are rotated by a given angle relative to each other, the given angle being 360 degrees/number of stator pole teeth.

8. The stator as recited in claim 5 wherein each surface oriented normal to the insertion direction situated within a total length of the laminated core intersects at least one of the protrusions.

9. The stator as recited in claim 5 wherein air gaps each equal in size are provided between the protrusions of the first winding support and the corresponding protrusions of the second winding support relative to the insertion direction.

10. The stator as recited in claim 5 wherein the protrusions of the first winding support and the corresponding protrusions of the second winding support overlap, relative to the insertion direction, a thus-defined overlapping area being larger than a thickness of individual laminations of the laminated core.

11. The stator as recited in claim 10 wherein the thus-defined overlapping area is at least 5 times larger than the thickness of the individual laminations of the laminated core.

12. The stator as recited in claim 5 wherein the winding support is made of an electrically insulating plastic and the protrusions are connected to each other in the form of a ring.

13. An electric motor comprising a stator as recited in claim claim 5.

14. A hand-held power tool comprising the electric motor as recited in claim 13.

15. The winding support as recited in claim 3 wherein three other adjacent protrusions each have a different same length than the same length.

16. The winding support as recited in claim 15 wherein the plurality of protrusions number exactly six.

17. A winding support serves to at least partially accommodate a stator coil of a stator, the winding support comprising:
a plurality of protrusions insertable in an insertion direction into a cavity formed by two adjacent stator pole teeth of a laminated core of the stator, at least one of the protrusions having a different length in the insertion direction than at least one of the other protrusions and wherein at least two adjacent protrusions have a same length and wherein the at least two adjacent protrusions having the same length include three adjacent protrusions have the same length.

18. The winding support as recited in claim 17 wherein three other adjacent protrusions each have a different same length than the same length.

19. The winding support as recited in claim 18 wherein the plurality of protrusions number exactly six.

\* \* \* \* \*